US010023074B2

(12) United States Patent
Buehs et al.

(10) Patent No.: US 10,023,074 B2
(45) Date of Patent: Jul. 17, 2018

(54) TRANSPORTATION SYSTEM WITH A NON-RAIL-BOUND VEHICLE TO BE SUPPLIED WITH ELECTRICAL ENERGY THROUGH AN OVERHEAD CONDUCTOR SYSTEM

(71) Applicant: SIEMENS AKTIENGESELLSCHAFT, Munich (DE)

(72) Inventors: Florian Buehs, Berlin (DE); Juergen Francke, Berlin (DE); Frank Gerstenberg, Berlin (DE); Oliver Graebner, Neubiberg (DE); Goeran Saenger, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 120 days.

(21) Appl. No.: 14/865,218

(22) Filed: Sep. 25, 2015

(65) Prior Publication Data
US 2016/0090007 A1  Mar. 31, 2016

(30) Foreign Application Priority Data
Sep. 25, 2014 (DE) .................. 10 2014 219 466

(51) Int. Cl.
*B60M 1/02* (2006.01)
*B60L 5/04* (2006.01)
(Continued)

(52) U.S. Cl.
CPC .............. *B60M 1/02* (2013.01); *B60L 5/045* (2013.01); *B60L 5/36* (2013.01); *B60M 1/12* (2013.01);
(Continued)

(58) Field of Classification Search
CPC . B60M 1/00; B60M 1/02; B60M 1/12; B60M 1/13; B60M 1/30
See application file for complete search history.

(56) References Cited

U.S. PATENT DOCUMENTS 4,070,584 A      1/1978  Chartraire et al.
2013/0245876 A1* 9/2013  Messerschmidt ....... B60L 5/045
                                                          701/22
(Continued)

FOREIGN PATENT DOCUMENTS

DE   102010053528 A1   5/2012
DE   102011076620 A1   11/2012
(Continued)

*Primary Examiner* — Robert J McCarry, Jr.
(74) *Attorney, Agent, or Firm* — Laurence Greenberg; Werner Stemer; Ralph Locher

(57) ABSTRACT

A transportation system with a non-rail-bound, electrically or diesel-electrically driven vehicle, has a two-pole overhead conductor system with contact wires forming supply and return conductors. The vehicle has a current collector for the supply of electrical energy through sliding contact with the contact wires. A video detector on the vehicle determines a position of the contact wires relative to the vehicle. Marking elements mark the position of the contact wires. The video detector is oriented for taking video images of the marking elements, and an evaluation unit recognizes from a recorded video image whether contact wires are present above the vehicle and, when they are present, determines their position relative to the vehicle. Through the improved recognition of the position of the vehicle relative to the overhead conductor the operational safety of the transportation system is improved.

14 Claims, 5 Drawing Sheets

(51) Int. Cl.
*B60L 5/36* (2006.01)
*B60M 1/12* (2006.01)
*B60M 1/13* (2006.01)
*B60M 1/23* (2006.01)

(52) U.S. Cl.
CPC ................ *B60M 1/13* (2013.01); *B60M 1/23* (2013.01); *B60L 2200/36* (2013.01)

(56) References Cited

U.S. PATENT DOCUMENTS

| | | |
|---|---|---|
| 2014/0097054 A1 | 4/2014 | Francke et al. |
| 2014/0110205 A1 | 4/2014 | Dronnik |
| 2014/0224609 A1 | 8/2014 | Saito et al. |

FOREIGN PATENT DOCUMENTS

| | | | |
|---|---|---|---|
| DE | 102011076623 A1 | 11/2012 | |
| DE | 102012205276 A1 | 10/2013 | |
| DE | 102012213460 A1 | 2/2014 | |
| DE | 112012004019 T5 | 7/2014 | |
| FR | 2540801 A1 * | 8/1984 | ................ B60L 5/16 |
| FR | 2540801 A1 | 8/1984 | |
| GB | 2244581 A | 12/1991 | |

\* cited by examiner

FIG 3
FIG 4
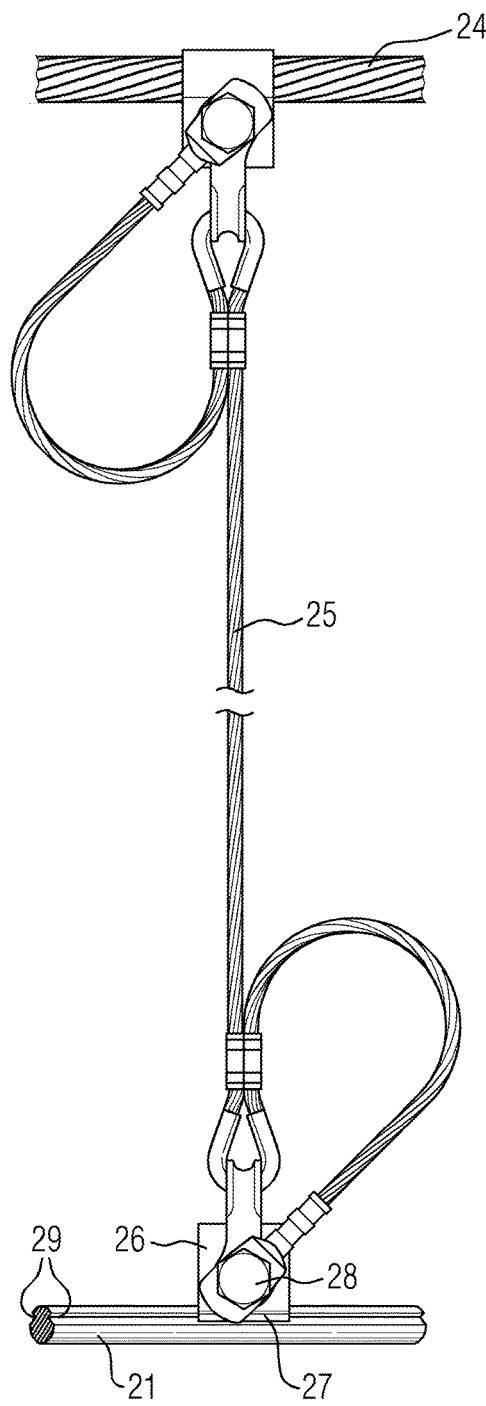
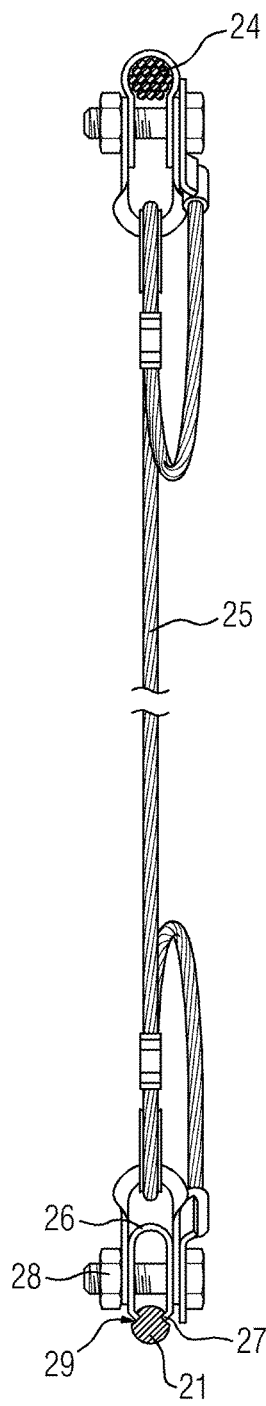

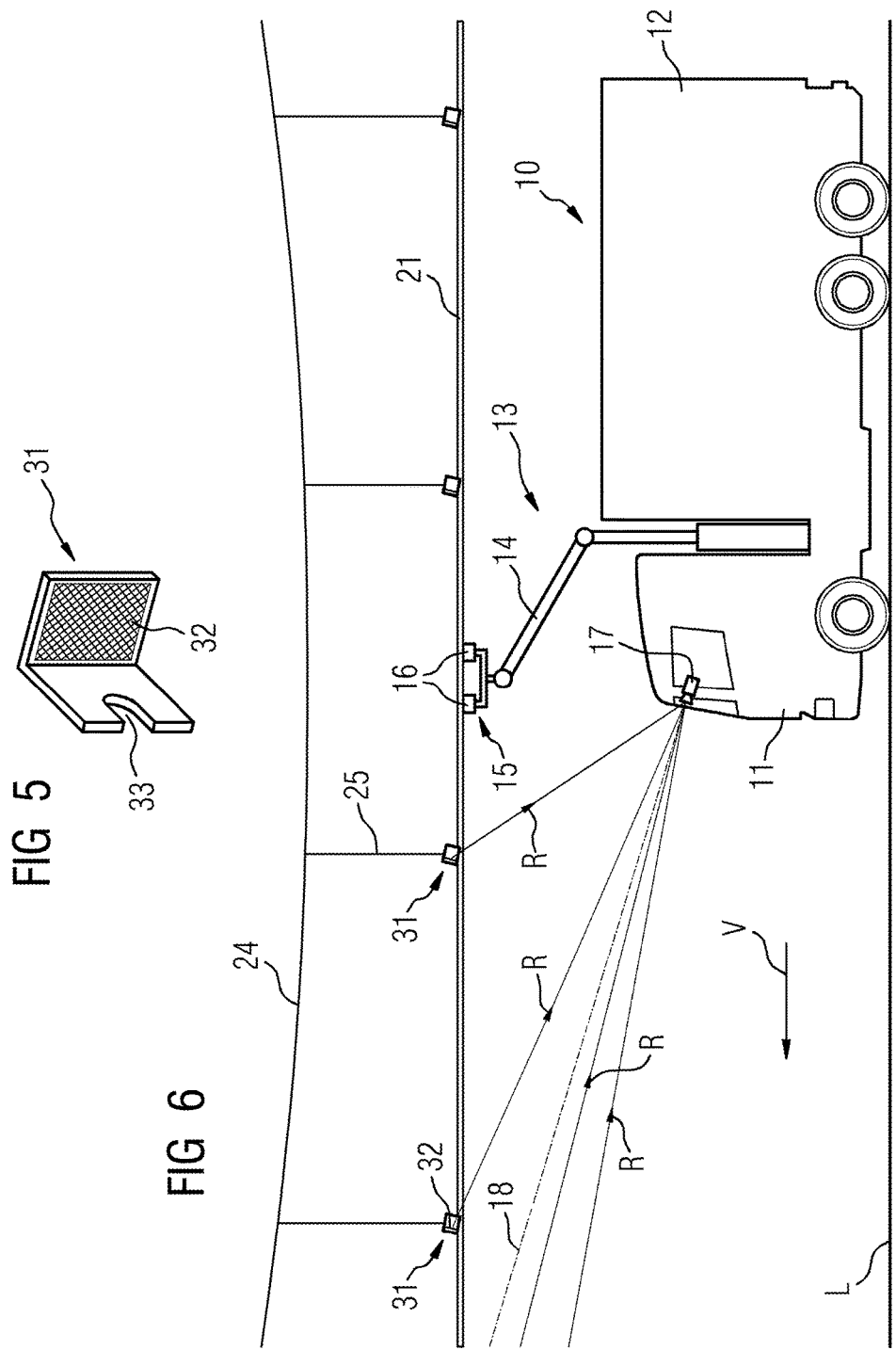

TRANSPORTATION SYSTEM WITH A NON-RAIL-BOUND VEHICLE TO BE SUPPLIED WITH ELECTRICAL ENERGY THROUGH AN OVERHEAD CONDUCTOR SYSTEM

CROSS-REFERENCE TO RELATED APPLICATION

This application claims the priority, under 35 U.S.C. § 119, of German patent application DE 10 2014 219 466.0, filed Sep. 25, 2014; the prior application is herewith incorporated by reference in its entirety.

BACKGROUND OF THE INVENTION

Field of the Invention

The invention relates to a transportation system with a non-rail-bound, electrically or hybrid-electrically driven vehicle. A two-pole overhead conductor system is disposed at least in sections along a track of the vehicle for the provision of electrical energy. The vehicle has a current collector for the supply of electrical energy through sliding contact with contacts wires, which are constructed as supply and return conductors, of the overhead conductor system. A video detector on the vehicle determines a position of the contact wires relative to the vehicle.

Such a transportation system includes at least one non-rail-bound electrically or hybrid-electrically driven vehicle, in particular a diesel-electric-driven truck. In addition it includes a two-pole overhead conductor system disposed at least in sections along a track of the vehicle for the provision of electrical energy. In this, the vehicle has a current collector for the supply and/or return of electrical energy through sliding contact to the contact wires constructed as supply and return wires of the overhead conductor system. The transportation system includes in addition a video detector disposed on the vehicle for determining a relative position of the contact wires relative to the vehicle.

Such a transportation system is, by way of example, described in published patent application US 2014/0097054 A1 and its counterpart German published patent application DE 10 2011 076 623 A1. The non-rail-bound vehicle has a current collector for the supply of electrical energy from a two-pole overhead conductor system of which each of the contact wires constructed as supply and return conductors can be contacted through at least one contact strip of the current collector. The current collector also has two carrier arms which are hinged to the vehicle and to a pantograph carrying the contact strips in such a way that they can be tilted and swiveled and thereby enable the pantograph to be both raised and lowered and moved transversely to the direction of travel. An actual position of the vehicle relative to the contact wires is captured by means of a position sensor that is constructed as a video camera fixed to the vehicle. The vehicle has a control device that determines a control variable from a comparison of the captured actual position with the prescribed desired position of the vehicle relative to the contact wires. In accordance with the specific control variable the control device drives an actuator for the lateral positioning of a pantograph carrying the contact strips. The actual position is based on the automated recognizability of the contact wires in the captured video images, for example by comparison with reference images. Comparison with the reference images requires the work of taking a reference image in advance for each place on the route and making it available to a vehicle for the journey over this route because in curves in the track or where the overhead conductor has a zig-zag course, the contact wires do not run parallel to the center of the track. Furthermore the comparison with reference images depends on video images taken during the journey, in which the contact wires can be unambiguously recognized. This is, however, under bad visibility conditions such as in the dark, in the presence of fog or precipitation, heavily impaired or even to the extent of being impossible. In addition both the lens of the video camera and the contact wires must be as far as possible free of dirt, which in practice is unlikely to be achieved.

A comparable transportation system is known from the German published patent application DE 10 201 2 205 276 A1, in which a laser scanner is proposed as position sensor that senses the position of the contact wires by means of laser radiation. In addition to the high procurement costs, a disadvantage of a laser scanner is that it contains movable parts that can be adversely affected under the harsh conditions of operation on the street. In addition the laser scanner needs to be fixed at the height of the bumper to achieve an adequate beam spread as far as the contact wires that are to be sensed, which results in an undesirable increase in the length of the vehicle. Finally, the determination of position in conditions of rain is considerably impaired.

Published patent application US 2013/0245876 A1 and its counterpart German published patent application DE 10 2010 053 528 A1 describe a system for automatic connecting to and disconnecting from the contact wires during the journey of an overhead-conductor vehicle. On the roof of an overhead-conductor bus two stereo-optical video cameras are mounted, from the image data of which positions of the two contact wires and of the contact shoes of the trolley booms relative to the vehicle are determined. Using the determined relative positions, captive cable motors are controlled to position the trolley booms in such a way that their contact shoes are positioned as required close under the overhead conductor if it is present in order to make electrical contact. If no contact wire is recognized no connection is made or an automatic disconnection is made. In the disconnected state the vehicle obtains its energy from a store and/or from a supplementary internal combustion engine. To ensure functioning during the dark, infrared light-emitting diodes are provided.

French published patent application FR 2 540 801 A1 describes an overhead-conductor bus with a control device for a current collector that has a boom that can be raised and lowered and rotated for lateral swiveling of its contact shoe. To the side of the rotating joint of the boom disposed on the roof of the overhead-conductor bus is a dot-shaped light source that emits a light beam rotating on a conical surface. It also includes a linear retro-reflector positioned at the same height as the overhead conductor and operates parallel to it at the same distance as the distance of the light source from the rotating joint of the current collector. A light beam reflected by the retro-reflector is detected by means of a light-sensitive cell. From the rotational position of the light beam when a detection occurs the position of the overhead conductor relative to the vehicle or to the current collector can be determined and the control device driven in such a way that the current collector does not lose contact with the overhead conductor.

British published patent application GB 2 244 581 A describes a system for reading bar code symbols from a moving vehicle for the purpose of determining its current position. For this purpose video cameras with a digital video image processing system are carried in the vehicle at the sides, each oriented to one side of the track. The bar codes are mounted at known locations along the travel route, for example on both sides of the track, the bar codes being oriented horizontally to provide an adequate time for them to be read. To cause a video image to be taken when the vehicle approaches the bar code signs, either a light beam sent from the side of the track is received by a sensor on the vehicle or its reception by a sensor at the side of the track is interrupted by the approaching vehicle in the manner of a light barrier. The bar codes can directly contain position information such as distances in meters or map-related reference information, which is then displayed to the driver on a screen including possible route options.

SUMMARY OF THE INVENTION

It is accordingly an object of the invention to provide a system with a non-rail-bound vehicle that can be supplied with electrical energy through an overhead conductor system which overcomes the above-mentioned and other disadvantages of the heretofore-known devices and methods of this general type and which has, relative to the prior art, an improved recognition of the position of the vehicle relative to the overhead conductor.

With the foregoing and other objects in view there is provided, in accordance with the invention, a transportation system with a non-rail-bound, electrically or hybrid-electrically driven vehicle, comprising:

a two-pole overhead conductor system for providing electrical energy disposed at least in segments along a track of the vehicle, the conductor system having contact wires constructed as supply and return conductors;

marking elements disposed on the overhead conductor system for marking a position of the contact wires;

a current collector carried on the vehicle for a supply of the electrical energy through sliding contact with the contacts wires;

a video detector disposed on the vehicle for determining a position of the contact wires relative to the vehicle, the video detector being oriented for taking video images of the marking elements associated with the contact wires; and an evaluation unit operatively connected to the video detector and configured to recognize from a recorded video image whether contact wires are present above the vehicle and, when the contact wires are present, to determine the position of the contact wires relative to the vehicle.

In other words, the novel transportation system includes at least a non-rail-bound, electrically or hybrid-electrically driven vehicle, in particular a diesel-electric-driven vehicle. In addition the transportation system includes a two-pole overhead conductor system disposed at least in sections along a track of the vehicle for the provision of electrical energy. In this, the vehicle has a current collector for the supply of electrical energy through sliding contact to the contact wires of the overhead conductor system constructed as supply and return conductors. The transportation system includes in addition a video detector disposed on the vehicle for determining a relative position of the contact wires relative to the vehicle. According to the invention the overhead conductor system has marking elements that mark the position of the contact wires. In addition the video detector is oriented for taking video images of the marking elements. In addition to this, an evaluation unit allocated to the video detector is constructed for the purpose of recognizing from a recorded video image whether contact wires are present above the vehicle and, if contact wires are present, to determine their position relative to the vehicle.

For the direct or indirect determination of the position of the contact wires, passive marking elements are used that in a digital video image are better recognized than the contact wires themselves, including in conditions of bad weather. The use of passive marking elements keeps the maintenance requirement low. Furthermore, video detectors are employed that are more economical and more robust in comparison to laser scanners. The relative position of the contact wires is calculated from the recorded video image data through the use of the evaluation unit. In doing this, the position and orientation of the video detector on the vehicle are taken into account. The evaluation unit determines whether an overhead conductor is present and if so, whether it is the correct overhead conductor, not the type intended for trolley buses or streetcars; only then is the current collector permitted to be released and lifted to avoid collisions with sign gantries, bridges, light signal installations and similar infrastructure installations or to prevent sideways hooking the pantograph onto the contact wire. When the current collector has made secure contact, the determination of the relative position serves for the lateral positioning of the current collector for the compensation of travel maneuvers transverse to the direction of travel of the vehicle. By this means the sliding contact of the current collector with the overhead conductor can be maintained within specifiable travel tolerances and safely disconnected if a threshold value of lateral displacement of the current collector is exceeded. Thus, for position detection the number of contact wires, the contact wire spacing, the contact wire height and the contact wire offset from the longitudinal center of the vehicle can be calculated from the video image data.

The video detector is preferably constructed as a stereo camera and/or a transit-time camera. A stereo camera has in most cases two lenses mounted next to each other and enables the simultaneous taking of the images of the stereoscopic image pair required for 3D images. The control of exposure and focusing of the two lenses are coupled. In addition, the stereo camera can be constructed as a transit-time camera that uses a light pulse to illuminate the scene to be recorded. For each image point the transit-time camera measures the time required for the light to travel to the object and back again. The required time is directly proportional to the distance. The transit-time camera thereby supplies for each image the distance of the object depicted in it. The principle corresponds to that of a laser scanner with the advantage that an entire scene is taken at once without the need for scanning.

In an advantageous embodiment of the transportation system according to the invention the video detector is disposed within a driver cab of the vehicle and an acquisition axis of the video detector is oriented in the direction of travel of the vehicle or at an acute angle to the direction of travel. By placing the video detector within the driver cab it is well protected from external influences of pollution and weather and from mechanical damage. Windshield wipers and windshield washers make possible a good view through the windshields to the exterior and thereby the taking of video images that can be well evaluated. Furthermore the placing of the video detector in the driver cab avoids fitting a position sensor in the area of the front bumper which reduces the load area for a vehicle of maximum length. By orienting the video detector at a shallow angle to the direction of travel, video images are taken from positions that the vehicle reaches with a greater or lesser time delay depending on the speed of travel. During this time the control device can determine the currently required control variable from the acquired relative position and the actuator can drive the current collector accordingly.

In accordance with an added feature of the invention, the video detector has an illumination unit constructed for sending infrared light in the direction of the acquisition axis. By this means influences from the sun and from fog can be eliminated and the use of infrared elimination filters on the video detector is expedient.

In accordance with an additional feature of the invention, each of the marking elements has a retroreflective reflection surface for incident light. A known reflection surface of this type reflects incident light mainly back in the direction of arrival so that the visibility of the marking element is to a great extent independent of the position of the light source. During darkness even the light from the vehicle headlights can serve as the light source.

In a preferred embodiment of the transportation system according to the invention the marking elements are formed by angle pieces that have a first limb with the reflection surface and a second limb with an attachment interface and that are fastened to the contact wires and/or to suspension clamps of the contact wires. By way of example the attachment interface can be constructed as an elongated hole for supporting the second limb under a bolt head of a suspension clamp. The attachment interface can also be constructed as a shape for pushing the second limb onto the bolt head. However the attachment interface can also be constructed as an elastic spring clamp for latching in the clamp grooves of a contact wire. In each case the angle piece is attached to the contact wire and/or to the suspension clamp in such a way that it cannot be touched by a contact strip that passes by. In this, the first limb of the angle piece is oriented approximately perpendicular to the acquisition axis of the video detector in order that reflected light is reflected mainly in the direction of the video detector. In this way the marking elements directly represent position markers of the contact wire or contact wires. Attachment of the angle pieces to suspension clamps also marks positions of contact wires between the masts of the overhead conductor system where the deviation of the position of the contact wires from their intended position can be the greatest as a result of wind pressure. Angle pieces can be attached to each of the two contact wires but preferably only to one contact wire in order to keep the material cost and the installation time low. The distance between the locations of installation should be selected to be short enough that the marked contact wire between two successive angle pieces can be regarded to a good approximation as being straight.

In accordance with another feature of the invention, the marking elements are formed from longitudinal profile pieces that have a roof-shaped cross-section and reflection surfaces pointing downwards for incident light and that are attached to the contact wires and/or to a retaining cable running parallel to the latter and/or to brackets of the overhead conductor system. In order that the evaluation unit can draw conclusions from the route of the profile pieces about the route of the contact wires the latter are arranged in a fixed spatial relationship to each other. The profile pieces have a dirt-repellent surface with self-cleaning properties. In addition the surface of the profile pieces is a good reflector and wider than for example the diameter of a contact wire in order that the profile piece is also well visible in the dark. It is advantageous for the marking element to be constructed as a C-profile piece with the opening facing downwards with its longitudinal side oriented parallel to the contact wires. As a consequence of the longitudinal extension determination of relative position in particular is possible even when there is a shallow angle between the acquisition axis of the video detector and the direction of travel. The profile pieces can have a continuous arrangement adjacent to each other on a contact wire or on a retaining cable running parallel to it or alternatively interrupted at discrete locations of the contact wire or on brackets of the overhead conductor system.

The marking elements are preferably made from plastic or light metal. Through the selection of a lightweight material the catenary of the overhead conductor system is subject to the least possible additional load. In addition to plastics materials aluminum comes for example into consideration here.

In accordance with yet an added feature of the invention, the marking elements are attached to masts, or pylons, of the overhead conductor system disposed alongside the track and the video detector is constructed for the measurement of its distance to a marking element. The distance measurement can be achieved by triangulation or through the use of a transit-time camera. This embodiment makes possible an indirect determination of the relative position from the measured distance between vehicle and mast and the fixed relative position of the contact wires to the masts. A possible alternative would be the fixing of the marking elements on a sign with a defined location and defined relative position to the contact wires.

In a further advantageous embodiment of the transportation system according to the invention the marking elements are disposed at a lower height than the video detector and the acquisition axis of the video detector is inclined downwards relative to the horizontal. When the sun is in a low position this has an anti-glare effect in the direction of the acquisition axis, in particular in the direction of travel.

The acquisition axis of the video detector is preferably oriented transversely to the direction of travel. This orientation reduces functional deficits of the evaluation unit resulting from bad weather conditions and when the incident radiation from the sun is in the direction of travel. If the video detector is disposed outside the driver cab its orientation transverse to the direction of travel reduces the dirt pollution of the lens.

In a further preferred embodiment of the transportation system according to the invention the marking elements have an optically readable encoding area for location information and the evaluation unit is constructed to read out an information code represented by the encoding area from a recorded video image. By means of the encoding area any further desired information in addition to the location relationship between the marking element and the contact wires can be made available that can then be retrieved by reading out the information code.

The evaluation unit is preferably constructed to retrieve, through the use of the read-out information code, the location information from a database in or external to the vehicle. A database external to the vehicle can, for example, be queried through a wireless communications device in the vehicle. If the vehicle has a reception unit for position signals of a satellite-assisted navigation system, the position of the contact wire can be determined still more accurately through the use of the current vehicle position.

The location information preferably includes a running mast number and/or geographical mast coordinates and/or information about the route. A mast number or directly the coordinates of its location constitute information that can be used to support navigation. Information about the route being traveled can for example be information relating to hazards such as black ice, objects or oil on the track or else reports of accidents or congestion or also notification of a bend in the road or of an end of the overhead conductor.

Other features which are considered as characteristic for the invention are set forth in the appended claims.

Although the invention is illustrated and described herein as embodied in a transportation system with a non-rail-bound vehicle that can be supplied with electrical energy through an overhead conductor system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a side view of a suspension link of the overhead conductor system of FIG. 1, FIG. 4 is a front view of the suspension link of FIG. 3, FIG. 5 is a perspective view of a first exemplary embodiment of a marker element of the transportation system according to the invention, FIG. 6 is a side view of the inventive transportation system with marking elements as in FIG. 5.

DETAILED DESCRIPTION OF THE INVENTION

Figure 8:
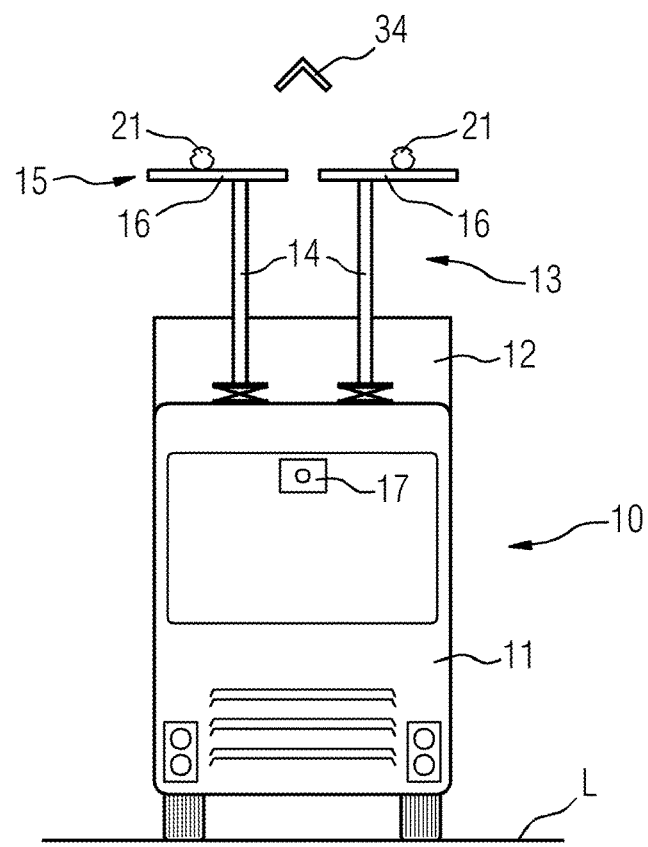
FIG. 8 is a front view of the transportation system according to the invention with marking elements as in FIG. 7.
Figure 10:
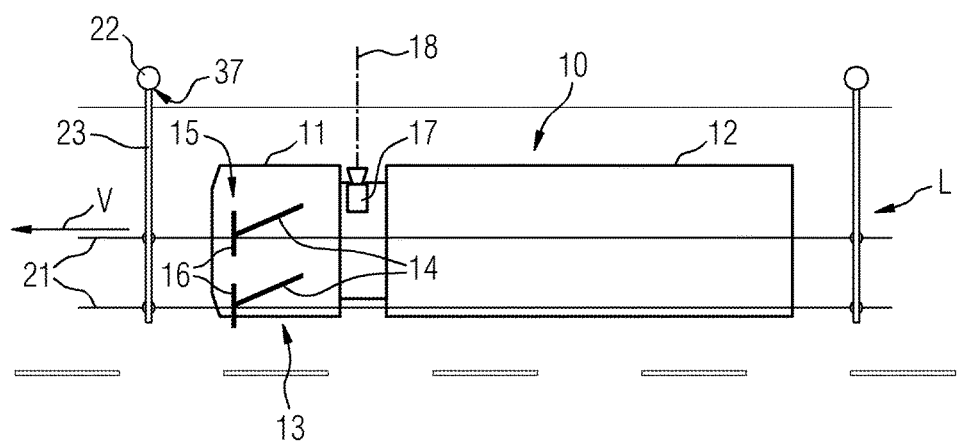
FIG. 10 is a plan view of the transportation system according to the invention with marking elements as in FIG. 9.

A transportation system according to the invention includes—as in FIG. 6, FIG. 8 and FIG. 10—a non-rail-bound vehicle 10 which is electrically or hybrid-electrically driven. The vehicle 10 constructed as a diesel-electrically driven truck has a driver cab 11, a load-carrying structure 12 disposed to its rear and a current collector 13 supported between them for the supply of electrical energy from a two-pole overhead conductor system 20 of the transportation system.

According to the illustrations in FIGS. 1-4 the overhead conductor system 20 has contact wires 21 constructed as supply and return conductors that run parallel to each other above a track L of the vehicle 10, over the right-hand lane of a multiple-lane highway. To this end the overhead conductor system 20 has, erected along the track L, masts 22 from which support booms 23 extend laterally over the track L. In addition two catenary wires 24 run over the track L and are supported by the support booms 23 and hang in a catenary curve between them. On each catenary wire 24 is hung one contact wire 21 by means of a large number of suspension cables 25 the lengths of which reduce with increasing distance from the support booms so that an approximately constant height of the contact wire above the track L can be set. A suspension cable 25 is fixed to a contact wire 21 by means of a suspension clamp 26 of which each of the clamp edges 27 is held in a positive-locking manner by means of a bolted joint 28 in one of two longitudinal grooves 29 of the contact wire 21. This manner of fastening ensures that the suspension clamps 26 do not constitute obstacles to the sliding of the current collector 13 of the vehicle 10 along the contact wires 21. At the ends of the longitudinal conductors 21 and 24, the tension is taken off the catenary cables by means of tensioning devices not more closely described.

With reference to FIG. 6, the current collector 13 has two support arms 14 that carry a pantograph assembly 15 with contact strips 16. The support arms 14 are pivotally mounted on the vehicle about horizontal axes, whereby the pantograph assembly 15 can, by way of a non-illustrated lifting device, be raised and lowered between a lower resting position in which the current collector 13 is positioned above the driver cab 11 and an upper working position in which the contact strips 16 make contact with the contact wires 21. In addition the support arms 14 are rotatably mounted on the vehicle about vertical axes whereby the pantograph assembly 15 can, by means of actuators not depicted, be swiveled laterally, in other words transversely to a direction of travel V of the vehicle 10. By this means it is possible when there are lateral travel errors within the track L to position the pantograph assembly 15 such that the contact strips 16 maintain the sliding contact with the contact wires 21 and thereby maintain the supply of energy. To this end a control device that is not depicted is provided that is connected to a video detector 17 disposed on the vehicle for determining a lateral relative position of the contact wires 21 relative to the vehicle 10. The control device has a controller that is not depicted that from the calculated relative position and the current position of the pantograph assembly 15 calculates a control variable for the actuators in such a way that the contact strips 16 make contact with the contact wires 21 within their working range. For this reason the control unit is connected to the actuators in order to transmit to them a control signal that corresponds to the calculated control variable. The actuators cause the pantograph assembly 15 to swivel by rotating the support arms 14 about their vertical axes.

This lateral positioning of the current collector 13 requires a reliable determination of the position of the vehicle 10 relative to the contact wires 21. Therefore according to the invention the overhead conductor system 20 has marking elements that mark the position of the contact wires 21. For this purpose the video detector 17 is oriented for taking video images of the marking elements. An evaluation unit that is not depicted is allocated to the video detector 17 and constructed for the purpose of recognizing from a recorded video image whether contact wires 21 are present above the vehicle 10 and, if contact wires 21 are present, to determine their position relative to the vehicle 10. The evaluation unit can for example be integrated in the video detector 17. The video detector 17 can be constructed as a stereo camera for taking 3D images or as a transit-time camera for measuring the distance between the video detector 17 and a marking element. The video detector 17 can have an illumination unit that is not depicted and that is constructed for sending infrared light in the direction of an acquisition axis 18 of the video detector 17.

In a first exemplary embodiment of the transportation system according to the invention as in FIGS. 5 and 6, the marking elements are formed by angle pieces 31. An angle piece 31 has a first limb with a preferably retro-reflective reflection surface 32 and a second limb with an attachment interface 33 in the form of an elongated hole. The angle pieces 31 are attached to the suspension clamps 26 of the contact wires 21 through the second limb being positioned under a bolt head of the bolted joint 28. The second limbs of the angle pieces 31 are oriented such that the normals to the reflection surface 32 are inclined downwards slightly away from the direction of travel V. Correspondingly the acquisition axis 18 of the video detector 17 is oriented in the direction of travel V or at an acute angle to it such that light R reflected from the reflection surface 32, for example light from vehicle headlights or infrared light of the illumination unit, is received by the video detector 17. The video detector 17 is disposed inside the driver cab 11 to avoid the effects of rain and dirt. Both for the driver of the vehicle 10 and for the evaluation unit of the video detector 17 the angle pieces 31 directly mark the course of a contact wire 21 which makes possible an improved determination of the relative position between vehicle 10 and contact wires 21.

Figure 1:
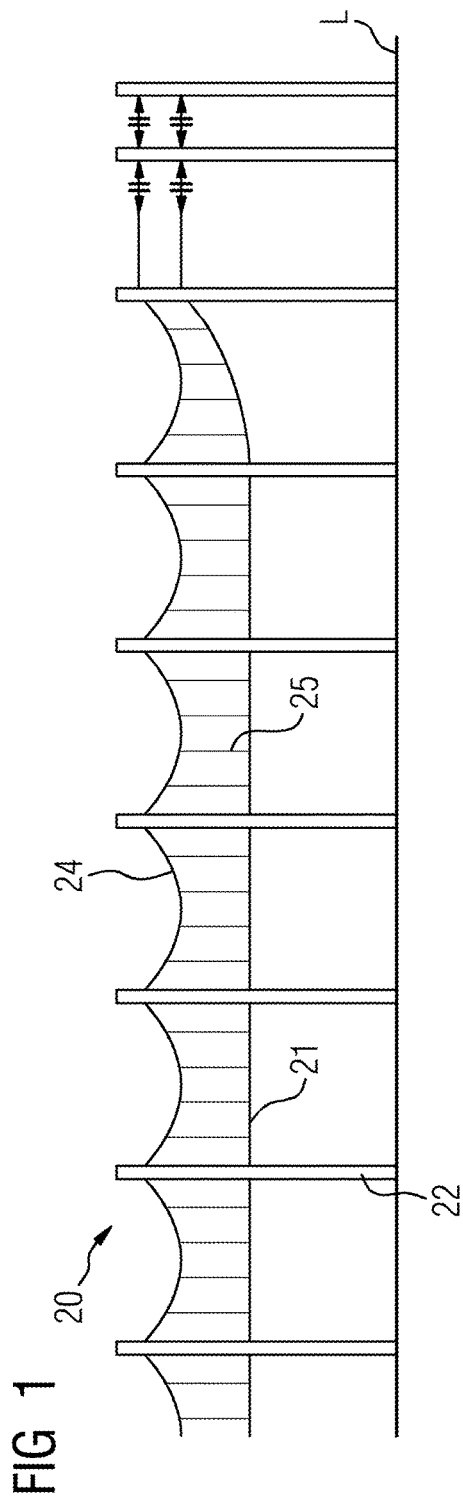
FIG. 1 is a side view of an overhead conductor system of the transportation system according to the invention.
Figure 2:
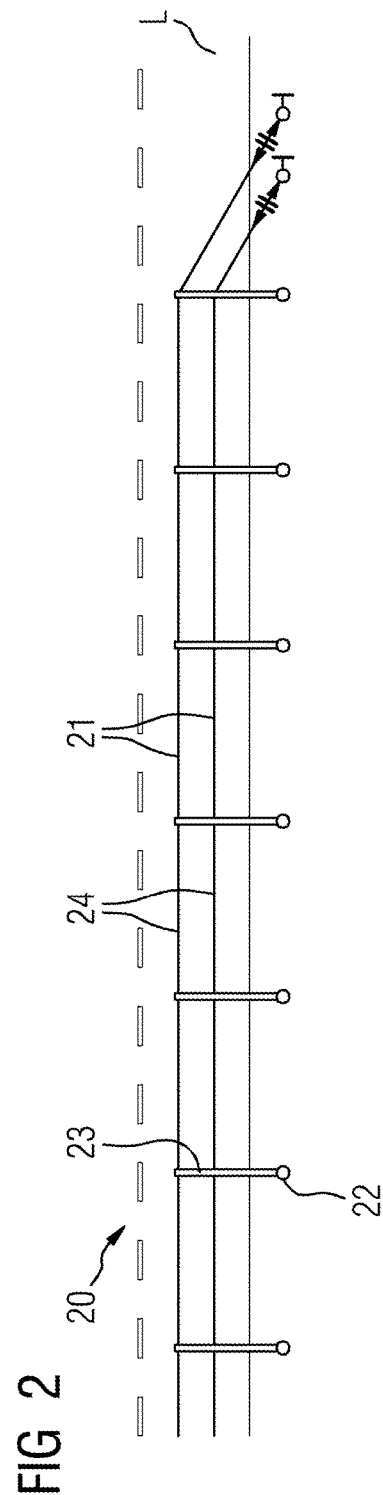
FIG. 2 is a plan view of the overhead conductor system of FIG. 1.
Figure 7:
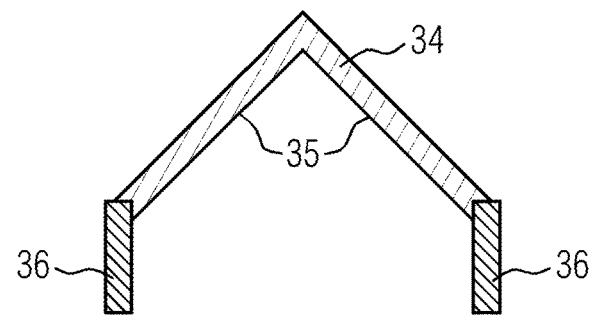
FIG. 7 is a cross-sectional view of a second exemplary embodiment of a marker element of the transportation system according to the invention.

In a second exemplary embodiment of the transportation system as in FIGS. 7 and 8 the marking elements are formed by elongated profile pieces 34. These have a roof-shaped cross-section and a downwards-pointing reflection surface 35 for incident light. The profile pieces 34 can for example be attached to a holding cable running parallel to the contact wires 21 and/or to booms of the overhead conductor system 20 that are not specifically depicted in FIG. 8. In each case the profile pieces 34 are disposed in a fixed spatial relationship to the contact wires 21 so that the evaluation unit of the video detector 17 can use the recorded video images from the location of the profile piece 34 to come to a conclusion concerning the position of the contact wires 21 and thereby also the relative position of the vehicle 10 to the contact wires 21. To protect the reflection surface 35 from dirt protective shields 36 protruding downwards can be disposed on the free side edges of the profile pieces 34. The profile pieces 34 are, as are the angle pieces 31 of the first exemplary embodiment, made of plastic or light metal, in particular of aluminum, to apply the lowest possible extra load due to marking elements on the catenary cables of the overhead conductor system 20.

Figure 9:
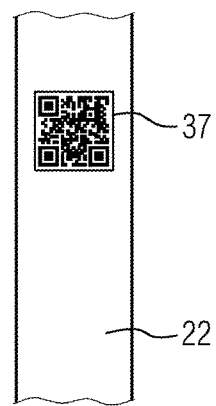
FIG. 9 is a side view of a third exemplary embodiment of a marker element of the transportation system according to the invention.
Figure 11:
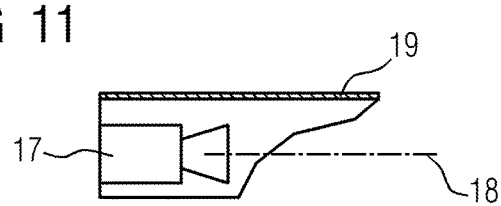
FIG. 11 is a front view of a video detector of the transportation system as in FIG. 10.

In a third exemplary embodiment of the transportation system according to the invention as in FIGS. 9-11, the marking elements are attached to masts 22 of the overhead conductor system 20 on the sides of the masts that are oriented towards the track L. In this the video detector 17 is constructed for the measurement of its distance from the marking element when it passes a mast 22. The marking elements are preferably disposed on the mast 22 at a lower height than the video detector 17 on the vehicle 10. By this means the acquisition axis 18 of the video detector 17 can be inclined downwards relative to the horizontal which gives protection from light glare when the sun is in a low position. The acquisition axis 18 of the video detector 17 that is here disposed between the driver cab 11 and the load-carrying structure 12 is oriented transversely to the direction of travel V thereby reducing the adverse effects of rain on distance measurement and the recording of images. Weather protection in the form of a shield 19 is disposed about the video detector 17 if it is disposed outside the driver cab 11 as in FIG. 11. Each of the marking elements has an optically readable encoding area 37 for location information, for example in the form of a so-called two-dimensional Quick-Response Code. The evaluation unit is constructed to obtain from a recorded video image an information code represented by the encoding area 37. By means of the obtained information code the evaluation unit retrieves the location information from a database in the vehicle or through the use of wireless communication means from a database external to the vehicle. The location information can include a running mast number and/or geographical mast coordinates which enable the evaluation unit in combination with the measured distance to the mast to deduce the position of the contact wires 21 relative to the vehicle 10. In addition the location information can include information about the route being traveled such as current information about black ice, oil or obstacles, traffic disruption or curves in the imminent section of the route that can be made available to the driver of the vehicle 10 through an acoustic and/or visual output interface.

In all exemplary embodiments, that can also be combined with each other, the marking elements that are easily recognized in the recorded video images can be used to determine directly or indirectly whether there is any contact wire 21 in the vicinity of the vehicle 10, whether the correct number of contact wires 21 is present, what distance these have from each other and from the surface of the track L and what is the lateral displacement between them and a longitudinal center of the track. From this the evaluation unit can, where applicable with further information about mast positions and distances to the mast, calculate the current position of the vehicle 10 relative to the contact wires 21. In this the use of economical stereo- or transit-time cameras as video detectors 17 is possible including during bad weather conditions. The control device of the current collector 13 connected to the evaluation unit controls the lifting device for raising the pantograph assembly 15 when the evaluation unit has established the presence of the correct overhead conductor. It drives the actuators for the lateral swiveling of the pantograph assembly 15 when the evaluation unit has determined that the relative position between vehicle 10 and contact wires 21 could cause the threat of a loss of contact of the contact strips 16 with the contact wires. If the threatened loss of contact can no longer be avoided by lateral positioning of the current collector 13, the control device controls the lifting device to lower the pantograph assembly 15.

The invention claimed is:

1. A transportation system with a non-rail-bound, electrically or hybrid-electrically driven vehicle, comprising:
    a two-pole overhead conductor system for providing electrical energy disposed at least in segments along a track of the vehicle, the conductor system having contact wires constructed as supply and return conductors;
    marking elements disposed on said overhead conductor system for marking a position of the contact wires;
    a current collector carried on the vehicle for a supply of the electrical energy through sliding contact with said contacts wires;
    a video detector disposed on the vehicle for determining a position of said contact wires relative to the vehicle, said video detector being oriented for taking video images of said marking elements associated with said contact wires, said video detector being disposed within a driver cab of the vehicle and an acquisition axis of said video detector being oriented in a direction of travel of the vehicle or at an acute angle relative to the direction of travel; and an evaluation unit operatively connected to said video detector and configured to recognize from a recorded video image whether contact wires are present above the vehicle and, when said contact wires are present, to determine the position of said contact wires relative to the vehicle.

2. The transportation system according to claim 1, wherein said video detector is a stereo camera and/or a transit-time camera.

3. The transportation system according to claim 1, wherein said video detector includes an illumination unit constructed for sending infrared light in a direction of an acquisition axis thereof.

4. The transportation system according to claim 1, wherein each of said marking elements is formed with a retroreflective reflection surface for incident light.

5. The transportation system according to claim 4, wherein said marking elements are angle pieces having a first limb with said reflection surface and a second limb with an attachment interface, and wherein said marking elements are attached to one or both of said contact wires or suspension clamps of said contact wires.

6. The transportation system according to claim 1, wherein said marking elements are elongated profile pieces formed with a roof-shaped cross-section and a reflection surface pointing downwards for incident light and said profile pieces are attached to said contact wires, to a retaining cable running parallel to said contact wires, and/or to booms of said overhead conductor system.

7. The transportation system according to claim 1, wherein said marking elements are made from plastic or light metal.

8. The transportation system according to claim 1, wherein said evaluation unit takes said marking elements and a position of said video detector into account to determine the position of said contact wires relative to the vehicle.

9. A transportation system with a non-rail-bound, electrically or hybrid-electrically driven vehicle, comprising:

a two-pole overhead conductor system for providing electrical energy disposed at least in segments along a track of the vehicle, the conductor system having contact wires constructed as supply and return conductors;

marking elements disposed on said overhead conductor system for marking a position of the contact wires;

a current collector carried on the vehicle for a supply of the electrical energy through sliding contact with said contacts wires;

a video detector disposed on the vehicle for determining a position of said contact wires relative to the vehicle, said video detector being oriented for taking video images of said marking elements associated with said contact wires; and an evaluation unit operatively connected to said video detector and configured to recognize from a recorded video image whether contact wires are present above the vehicle and, when said contact wires are present, to determine the position of said contact wires relative to the vehicle;

said overhead conductor system including masts disposed alongside the track of the vehicle, said marking elements being attached to said masts, and said video detector being configured for measuring a distance thereof to a respective marking element.

10. The transportation system according to claim 9, wherein said marking elements are disposed at a lower height level than said video detector and an acquisition axis of said video detector is inclined downwards relative to the horizontal.

11. The transportation system according to claim 9, wherein said video detector has an acquisition axis oriented transversely to a direction of travel.

12. The transportation system according to claim 9, wherein each of said marking elements includes an optically readable encoding area for location information and said evaluation unit is configured for reading an information code represented by said encoding area from a recorded video image.

13. The transportation system according to claim 12, wherein said evaluation unit is configured to retrieve, through a use of the information code thus obtained, a location information from a database in or external to the vehicle.

14. The transportation system according to claim 12, wherein the location information includes information selected from the group consisting of a running mast number, geographical mast coordinates, and information about the route.

* * * * *